United States Patent
Wang et al.

(10) Patent No.: US 7,422,982 B2
(45) Date of Patent: Sep. 9, 2008

(54) METHOD AND APPARATUS FOR ELECTROPROCESSING A SUBSTRATE WITH EDGE PROFILE CONTROL

(75) Inventors: You Wang, Cupertino, CA (US); Jie Diao, San Jose, CA (US); Stan D. Tsai, Fremont, CA (US); Lakshmanan Karuppiah, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 11/483,843

(22) Filed: Jul. 7, 2006

(65) Prior Publication Data

US 2008/0014709 A1 Jan. 17, 2008

(51) Int. Cl.
*H01L 21/302* (2006.01)
*H01L 21/461* (2006.01)

(52) U.S. Cl. ............... 438/692; 438/693; 438/714; 438/729; 257/E21.583; 257/E21.304; 216/83

(58) Field of Classification Search .......... 438/692, 438/693, 714, 729; 257/E21.583, E21.304; 216/83

See application file for complete search history.

(56) References Cited

U.S. PATENT DOCUMENTS

| | | | |
|---|---|---|---|
| 3,162,588 A | 12/1964 | Bell | |
| 3,448,023 A | 6/1969 | Bell | |
| 3,873,512 A | 3/1975 | Latanision | |
| 4,119,515 A | 10/1978 | Costakis | |
| 4,125,444 A | 11/1978 | Inoue | |
| 4,713,149 A | 12/1987 | Hoshino | |
| 4,793,895 A | 12/1988 | Kaanta et al. | |
| 4,839,993 A | 6/1989 | Masuko et al. | |
| 4,934,102 A | 6/1990 | Leach et al. | |
| 4,954,141 A | 9/1990 | Takiyama et al. | |
| 4,956,056 A | 9/1990 | Zubatova et al. | |
| 5,096,550 A | 3/1992 | Mayer | |
| 5,136,817 A | 8/1992 | Tabata et al. | |

(Continued)

FOREIGN PATENT DOCUMENTS

EP 0 325 753 8/1989

(Continued)

OTHER PUBLICATIONS

Contolini "Electrochemical Planarization of ULSI Copper," *Solid State Technology*; vol. 40, No. 6, Jun. 1, 1997, pp. 155-156, 158, 160, 162.

(Continued)

*Primary Examiner*—Walter L. Lindsay, Jr.
*Assistant Examiner*—Ron E Pompey
(74) *Attorney, Agent, or Firm*—Patterson & Sheridan (57) ABSTRACT

A method and apparatus for electroprocessing a substrate is provided. In one embodiment, a method for electroprocessing a substrate includes the steps of biasing a first electrode to establish a first electroprocessing zone between the electrode and the substrate, and biasing a second electrode disposed radially inward of the first electrode with a bias that is different than the bias applied to the first electrode. In one embodiment, the first electrode is coated with an inert material and in this way the same polish rate is obtained with a lower potential level applied to the first electrode.

11 Claims, 5 Drawing Sheets

U.S. PATENT DOCUMENTS

| | | | |
|---|---|---|---|
| 5,217,586 A | 6/1993 | Datta et al. | |
| 5,225,034 A | 7/1993 | Yu et al. | |
| 5,534,106 A | 7/1996 | Cote et al. | |
| 5,543,032 A | 8/1996 | Datta et al. | |
| 5,567,300 A | 10/1996 | Datta et al. | |
| 5,575,706 A | 11/1996 | Tsai et al. | |
| 5,578,362 A | 11/1996 | Reinhardt et al. | |
| 5,624,300 A | 4/1997 | Kishii et al. | |
| 5,637,031 A | 6/1997 | Chen | |
| 5,738,574 A | 4/1998 | Tolles et al. | |
| 5,766,446 A | 6/1998 | Spindt et al. | |
| 5,804,507 A | 9/1998 | Perlov et al. | |
| 5,807,165 A | 9/1998 | Uzoh et al. | |
| 5,846,882 A | 12/1998 | Birang | |
| 5,871,392 A | 2/1999 | Meikle et al. | |
| 5,893,796 A | 4/1999 | Birang et al. | |
| 5,911,619 A | 6/1999 | Uzoh et al. | |
| 5,931,719 A | 8/1999 | Nagahara et al. | |
| 5,938,801 A | 8/1999 | Robinson | |
| 5,966,151 A | 10/1999 | Wakahara | |
| 6,001,008 A | 12/1999 | Fujimori et al. | |
| 6,004,880 A | 12/1999 | Liu et al. | |
| 6,010,395 A | 1/2000 | Nakajima | |
| 6,017,265 A | 1/2000 | Cook et al. | |
| 6,020,264 A | 2/2000 | Lustig et al. | |
| 6,024,630 A | 2/2000 | Shendon et al. | |
| 6,051,116 A | 4/2000 | Ichinose et al. | |
| 6,056,851 A | 5/2000 | Hsieh et al. | |
| 6,066,030 A | 5/2000 | Uzoh | |
| 6,068,818 A | 5/2000 | Ackley et al. | |
| 6,090,239 A | 7/2000 | Liu et al. | |
| 6,103,096 A | 8/2000 | Datta et al. | |
| 6,116,998 A | 9/2000 | Damgaard et al. | |
| 6,141,027 A | 10/2000 | Akutsu et al. | |
| 6,153,043 A | 11/2000 | Edelstein et al. | |
| 6,156,124 A | 12/2000 | Tobin | |
| 6,159,079 A | 12/2000 | Zuniga et al. | |
| 6,171,467 B1 | 1/2001 | Weihs et al. | |
| 6,176,992 B1 | 1/2001 | Talieh | |
| 6,210,257 B1 | 4/2001 | Carlson | |
| 6,234,870 B1 | 5/2001 | Uzoh et al. | |
| 6,238,271 B1 | 5/2001 | Cesna | |
| 6,244,935 B1 | 6/2001 | Birang et al. | |
| 6,248,222 B1 | 6/2001 | Wang | |
| 6,273,798 B1 | 8/2001 | Berman | |
| 6,297,159 B1 | 10/2001 | Paton | |
| 6,328,872 B1 | 12/2001 | Talieh et al. | |
| 6,358,118 B1 | 3/2002 | Boehm et al. | |
| 6,368,184 B1 | 4/2002 | Beckage | |
| 6,368,190 B1 | 4/2002 | Easter et al. | |
| 6,379,223 B1 | 4/2002 | Sun et al. | |
| 6,381,169 B1 | 4/2002 | Bocian et al. | |
| 6,386,956 B1 | 5/2002 | Sato et al. | |
| 6,391,166 B1 | 5/2002 | Wang | |
| 6,395,152 B1 | 5/2002 | Wang | |
| 6,402,591 B1 | 6/2002 | Thornton | |
| 6,406,363 B1 | 6/2002 | Xu et al. | |
| 6,409,904 B1 | 6/2002 | Uzoh et al. | |
| 6,413,388 B1 | 7/2002 | Uzoh et al. | |
| 6,413,403 B1 | 7/2002 | Lindquist et al. | |
| 6,440,295 B1 | 8/2002 | Wang | |
| 6,447,668 B1 | 9/2002 | Wang | |
| 6,471,847 B2 | 10/2002 | Talieh et al. | |
| 6,482,307 B2 | 11/2002 | Ashjaee et al. | |
| 6,497,800 B1 | 12/2002 | Talieh et al. | |
| 6,582,281 B2 | 6/2003 | Doan et al. | |
| 6,612,904 B1 | 9/2003 | Boehm et al. | |
| 6,630,059 B1 | 10/2003 | Uzoh et al. | |
| 6,638,863 B2 | 10/2003 | Wang et al. | |
| 6,689,258 B1 | 2/2004 | Lansford et al. | |
| 6,693,036 B1 * | 2/2004 | Nogami et al. | 438/692 |
| 6,726,823 B1 | 4/2004 | Wang et al. | |
| 6,776,693 B2 | 8/2004 | Duboust et al. | |
| 6,979,248 B2 | 12/2005 | Hu et al. | |
| 2001/0005667 A1 | 6/2001 | Tolles et al. | |
| 2001/0024878 A1 | 9/2001 | Nakamura | |
| 2001/0027018 A1 | 10/2001 | Molnar | |
| 2001/0036746 A1 | 11/2001 | Sato et al. | |
| 2001/0040100 A1 | 11/2001 | Wang | |
| 2001/0042690 A1 | 11/2001 | Talieh | |
| 2002/0008036 A1 | 1/2002 | Wang | |
| 2002/0011417 A1 | 1/2002 | Talieh et al. | |
| 2002/0020621 A1 | 2/2002 | Uzoh et al. | |
| 2002/0025760 A1 | 2/2002 | Lee et al. | |
| 2002/0025763 A1 | 2/2002 | Lee | |
| 2002/0070126 A1 | 6/2002 | Sato et al. | |
| 2002/0077037 A1 | 6/2002 | Tietz | |
| 2002/0088715 A1 | 7/2002 | Talieh et al. | |
| 2002/0108861 A1 | 8/2002 | Emesh | |
| 2002/0119286 A1 | 8/2002 | Chen et al. | |
| 2002/0130049 A1 | 9/2002 | Chen et al. | |
| 2003/0104762 A1 | 6/2003 | Sato et al. | |
| 2003/0114087 A1 | 6/2003 | Duboust et al. | |
| 2003/0116446 A1 | 6/2003 | Duboust et al. | |
| 2003/0213703 A1 | 11/2003 | Wang et al. | |
| 2004/0023610 A1 * | 2/2004 | Hu et al. | 451/526 |
| 2004/0121708 A1 | 6/2004 | Hu et al. | |
| 2004/0154931 A1 | 8/2004 | Hongo et al. | |
| 2004/0173461 A1 * | 9/2004 | Tsai et al. | 204/640 |
| 2006/0163074 A1 | 7/2006 | Manens et al. | |
| 2006/0166500 A1 | 7/2006 | Manens et al. | |
| 2006/0201814 A1 * | 9/2006 | Hafezi et al. | 205/102 |

FOREIGN PATENT DOCUMENTS

| | | |
|---|---|---|
| EP | 0 455 455 | 11/1991 |
| EP | 1 103 346 | 11/2000 |
| JP | 11042554 | 2/1999 |
| JP | 2001-77117 | 9/2002 |
| WO | WO 98/49723 | 11/1998 |
| WO | WO 99/41434 | 8/1999 |
| WO | WO 99/53119 | 10/1999 |
| WO | WO 00/03426 | 1/2000 |
| WO | WO 00/26443 | 5/2000 |
| WO | WO 2004/024394 | 5/2000 |
| WO | WO 00/33356 | 6/2000 |
| WO | WO 00/59682 | 10/2000 |
| WO | WO 01/49452 | 7/2001 |
| WO | WO 01/88229 | 11/2001 |
| WO | WO 02/23616 | 3/2002 |
| WO | WO 02/064314 | 8/2002 |
| WO | WO 03/001581 | 1/2003 |

OTHER PUBLICATIONS

D. Landolt, "Fundamental Aspects of Electropolishing", Mar. 18, 1996, pp. 1-11.

Nogami "An Innovation to Integrate Porous Low-K Materials and Copper",*InterConnect Japan 2001*; Honeywell Seminar (Dec. 6, 2001); pp. 1-12.

Partial International Search Report for US 02/40754 dated Apr. 28, 2003.

PCT International Preliminary Examination Report for PCT/US02/04806, dated Sep. 7, 2004.

PCT International Preliminary Examination Report for PCT/US03/06058, dated Sep. 7, 2004.

PCT International Search Report and Written Opinion dated Jun. 30, 2006 for PCT/US2006/002595.

PCT International Search Report for PCT/US 02/11009 dated Feb. 6, 2003.

PCT International Search Report for PCT/US03/01760 dated May 27, 2003.

PCT International Search Report for PCT/US03/29230 dated Feb. 3, 2004.

PCT International Search Report for PCT/US04/006385 dated May 17, 2005.
PCT International Search Report for US 02/04806 dated Apr. 1, 2003.
PCT International Search Report for US 03/06058 dated Jun. 25, 2003.
PCT Invitation to Pay Additional Fees for PCT/US04/006385 dated Mar. 22, 2005.

PCT Written Opinion for PCT/US02/04806, dated Mar. 9, 2004.
PCT Written Opinion for PCT/US03/01760 dated Mar. 8, 2004.
PCT Written Opinion for PCT/US03/06058, dated Feb. 13, 2004.

* cited by examiner

METHOD AND APPARATUS FOR ELECTROPROCESSING A SUBSTRATE WITH EDGE PROFILE CONTROL

BACKGROUND OF THE INVENTION

1. Field of the Invention

Embodiments of the invention generally relate to profile control for electroprocessing substrates.

2. Description of the Related Art

Electrochemical Mechanical Polishing (ECMP) is a technique used to remove conductive materials from a substrate surface by electrochemical dissolution while concurrently polishing the substrate with reduced mechanical abrasion as compared to conventional Chemical Mechanical Polishing (CMP) processes. Electrochemical dissolution is performed by applying a bias between a cathode and a substrate surface to remove conductive materials from the substrate surface into a surrounding electrolyte. The bias may be applied to the substrate surface by a conductive contact disposed on or through a polishing material upon which the substrate is processed. A mechanical component of the polishing process is performed by providing relative motion between the substrate and the polishing material that enhances the removal of the conductive material from the substrate.

Profile control in some electroprocessing apparatuses has been generally realized by creating a plurality of process cells or zones across the width of the substrate being processed. By controlling the electrical bias or current flow between the individual cells, the rate of removal or deposition of conductive material on the substrate may be controlled.

However, control of the processing rate at the edge of the substrate has presented a significant challenge. As the electric potential of the electrolyte adjacent to the substrate has a greater (more negative) potential relative to the electrolyte located between the substrate and the electrode that defines a process cell, the voltage gradient is high at the edge of the substrate. The high voltage gradient may cause greater current densities, and thus faster processing at the edge of the substrate. Uncontrolled fast edge processing is generally undesirable because of the resulting reduction in the usable substrate area for device fabrication. Thus, it would be desirable to improve profile control of an electroprocess such that the area near the edge of the substrate would have material removal rates that could be controlled for fast edge polishing, as well as for slow edge polishing where desirable.

Thus, there is a need for an improved method and apparatus for electroprocessing.

SUMMARY OF THE INVENTION

Embodiments of the invention generally provide methods and apparatuses for electroprocessing a substrate. In one embodiment, an apparatus for electrochemically processing the substrate includes a conductive processing surface adapted for processing a substrate thereon, and a polishing head for retaining the substrate against the processing surface. At least one drive mechanism provides relative motion between the conductive processing surface and the substrate. A first electrode is disposed below the conductive processing surface and is comprised of a first material. A second electrode is disposed radially inward of the first electrode and comprised of a second material.

In another embodiment, a method of electroprocessing a substrate includes biasing a conductive processing surface, contacting a substrate to the biased conductive processing surface, biasing a first electrode to establish a first electroprocessing zone between the first electrode and the substrate and biasing a second electrode to establish a second electroprocessing zone, wherein the second electrode is radially disposed inward of the first electrode, fabricated from a different material and biased at different potentials.

In another embodiment, a method of electroprocessing a substrate includes detecting an incoming thickness profile of a substrate, selecting a polishing rate profile in response to the incoming thickenss profile, biasing a first electrode to establish a first electroprocessing zone between the first electrode and the substrate based on the incoming profile, and biasing a second electrode disposed radially inward of the first electrode with a potential different than the first electrode to establish a second electroprocessing zone between the second electrode and the substrate, wherein the first electrode and the second electrode are comprised of different materials.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is also contemplated that features from one embodiment may be beneficially incorporated in other embodiments without further recitation.

DETAILED DESCRIPTION

Figure 1:
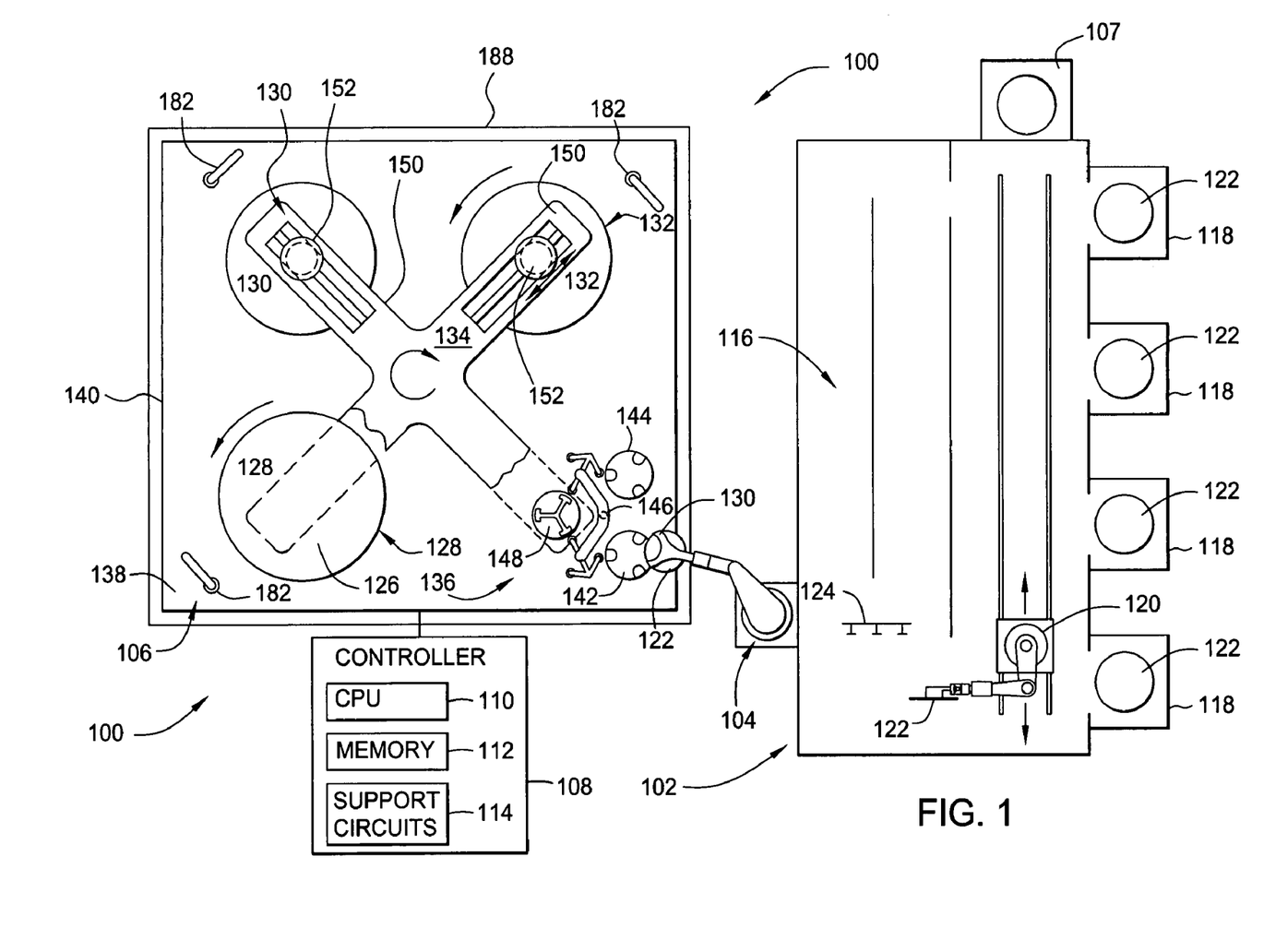
FIG. 1 illustrates a plan view of a substrate processing system.

FIG. 1 is a plan view of one embodiment of a processing system 100 for electrochemically processing a substrate in which the invention may be practiced. It is contemplated that other systems having different configurations may be adapted to benefit from the invention. The exemplary system 100 generally comprises a factory interface 102, a loading robot 104, one or more substrate storage cassettes 118, a planarizing module 106, and a metrology module 107. The loading robot 104 is disposed proximate to the factory interface 102 and to the planarizing module 106 in order to facilitate the transfer of substrates 122 therebetween.

The metrology module 107 is a non-destructive measuring device suitable for providing a metric indicative of the thickness profile of a substrate. The metrology module 107 may include eddy sensors, interferometer, capacitance sensor and/ or other suitable devices. Examples of suitable metrology modules include iScan™ and iMap™ substrate metrology modules, available from Applied Materials, Inc. The metrology module 107 provides the metric to a controller 108, wherein a target removal profile is determined for the specific thickness profile of a substrate.

The controller 108 is coupled to the various components of the processing system 100 to facilitate control of, for example, the planarizing, cleaning, and transfer processes between substrate processing station 126, and electrochemical mechanical planarizing stations 130 and 132. In addition, controller 108 provides a control signal to power source 242, which is adapted to apply different polarization potentials (voltages) or various levels of voltages, while the substrate is in a polishing station (e.g., electrochemical mechanical planarizing station 130) as described herein. The controller 108 generally includes a central processing unit (CPU) 110, a memory 112, and support circuits 114 as conventionally known.

The factory interface 102 generally includes a cleaning module 116 and one or more substrate cassettes 118. An interface robot 120 is employed to transfer substrates 122 between the substrate cassettes 118, the cleaning module 116 and an input module 124. The input module 124 is positioned to facilitate transfer of substrates 122 between the planarizing module 106 and the factory interface 102 by grippers, for example vacuum grippers or mechanical clamps (not shown). In addition, the interface robot 120 may be adapted to transfer substrates, before or after a polishing step, to the metrology module 107 in order to determine the thickness profile of a conductive layer on substrates 122.

The exemplary planarizing module 106 includes a transfer station 136 and a carousel 134 that are disposed on an upper or first side 138 of a machine base 140. In one embodiment, the transfer station 136 includes an input buffer station 142, an output buffer station 144, a transfer robot 146 and a load cup assembly 148. The input buffer station 142 receives substrates from the factory interface 102 by the loading robot 104. The loading robot 104 is also utilized to return polished substrates from the output buffer station 144 to the factory interface 102. The transfer robot 146 is utilized to move substrates between the buffer stations 142, 144 and the load cup assembly 148.

The planarizing module 106 also includes at least one electrochemical mechanical planarizing (ECMP) station 130, disposed in an environmentally controlled enclosure 188. Examples of planarizing modules 106 that can be adapted to benefit from the invention include MIRRA® Chemical Mechanical Planarizing Systems, MIRRA MESA® Chemical Mechanical Planarizing Systems, REFLEXION® Chemical Mechanical Planarizing Systems, REFLEXION® LK Chemical Mechanical Planarizing Systems, and REFLEXION® LK Ecmp Chemical Mechanical Planarizing Systems, all available from Applied Materials, Inc., of Santa Clara, Calif.

In the embodiment illustrated in FIG. 1, the planarizing module 106 includes one bulk ECMP station 132, a second ECMP station 130 and a third polishing station 128. The third polishing station may be an ECMP station, as described for ECMP stations 132 or 130, as shown in FIG. 1, or alternatively, it may be a conventional chemical mechanical polishing (CMP) station. Examples of conventional polishing systems that may be adapted to benefit from the invention are described in U.S. Pat. No. 6,988,942, filed on Jul. 20, 2004, and U.S. Pat. No. 6,977,036, filed on May 3, 2004, all of which are hereby incorporated by reference in their entireties.

In one embodiment, bulk removal of conductive material from the substrate 122 is performed through an electrochemical dissolution process at the bulk ECMP station 132. After the bulk material removal at the bulk ECMP station 132, residual conductive material is removed from the substrate at the residual ECMP station 130 through a second electrochemical mechanical process. It is contemplated that more than one residual ECMP station 130 may be utilized in the planarizing module 106. Barrier layer material may be removed at the third polishing station 128 after the conductive material has been removed. Alternatively, each of the first and second ECMP stations 132 and 130 may be utilized to perform the two-step conductive material removal (bulk and residual) on a single station.

The substrate processing system 100 may include a carousel 134 that is centrally disposed on the base 140. The carousel 134 typically includes a plurality of arms 150, each supporting a planarizing head assembly 152. Two of the arms 150 depicted in FIG. 1 are shown in phantom, such that the transfer station 136 and a planarizing surface 126 of the third ECMP station 128 may be seen. The carousel 134 is indexable such that the planarizing head assemblies 152 may be moved between the stations 132, 130, 128 and the transfer station 136.

Figure 2:
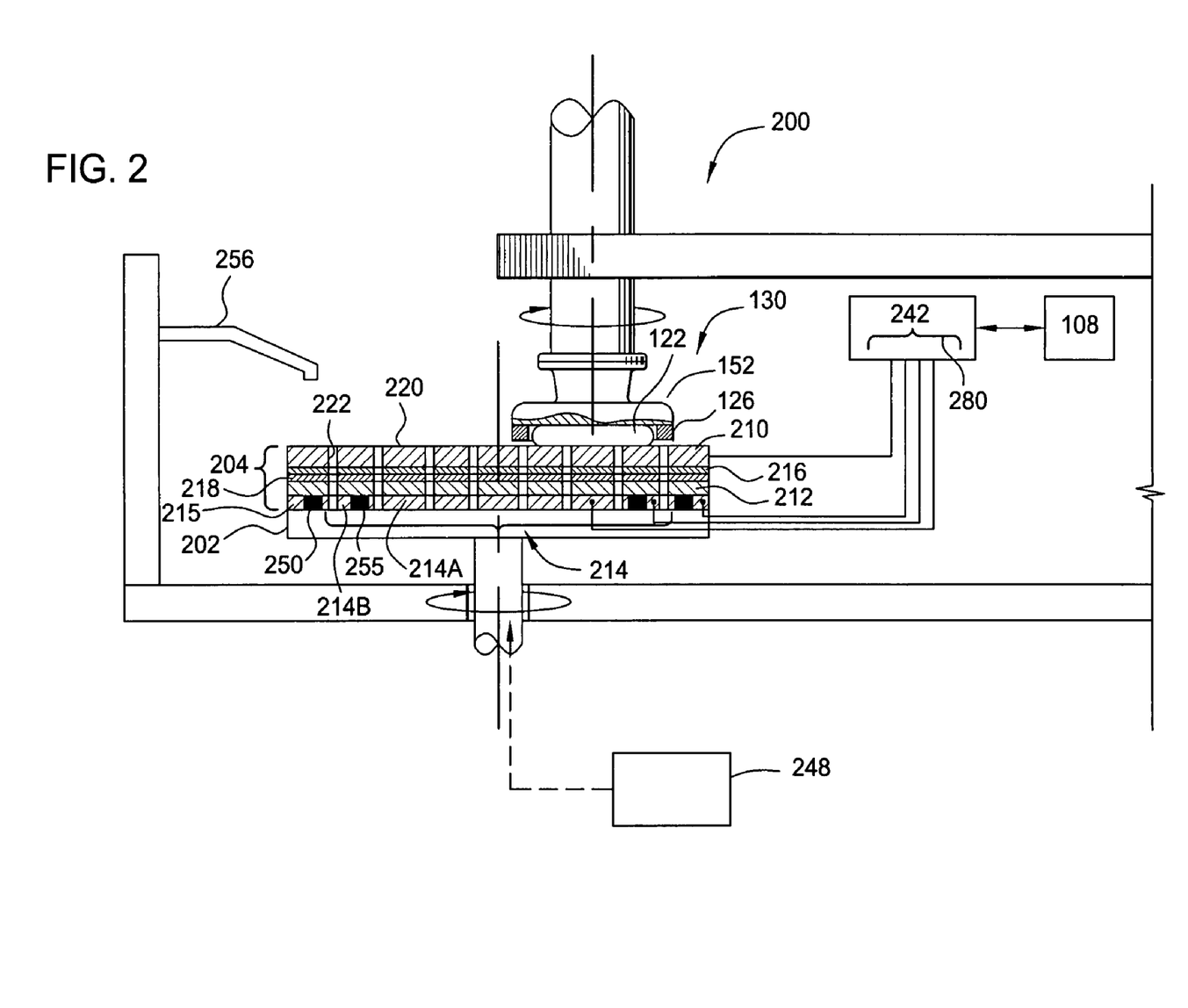
FIG. 2 illustrates a vertical sectional view of an embodiment of an ECMP station.

FIG. 2 illustrates a sectional view of one embodiment of the second ECMP station 130. The first and third stations 128 and 132 may be configured similarly. The second ECMP station 130 generally includes a platen 202 that supports a fully conductive processing pad assembly 204 as will be described below. The platen 202 may have a fluid delivery arm 256 disposed adjacent thereto configured to supply electrolyte to a planarizing surface of the processing pad assembly 204. Alternatively, the platen 202 may be configured to deliver electrolyte through the processing pad assembly 204 from the electrolyte source 248. The platen assembly 202 may include at least one sensor (not shown) to facilitate endpoint detection.

In one embodiment, the processing pad assembly 204 includes a conductive pad 210, a subpad 212, a counter electrode 214 and an auxiliary electrode 215. The conductive pad 210, subpad 212, counter electrode 214 and auxiliary electrode 215 may be fabricated into a single, replaceable assembly. The conductive pad 210 is substantially conductive across its top processing surface and is generally made from a conductive material, a conductive composite (i.e., the conductive elements are dispersed integrally with the planarizing surface) or a conductive fabric, among others. In the embodiment depicted in FIG. 2, the conductive pad 210 includes a top surface 220 comprising conductive particles dispersed in a polymer matrix.

The processing pad assembly 204 is generally permeable or perforated to allow electrolyte to pass between the counter electrode 214, the auxiliary electrode 215 and the top surface 220 of the conductive pad 210. In the embodiment illustrated in FIG. 2, the processing pad assembly 204 is perforated by apertures 222 to allow electrolyte to flow between the top surface 220 and the electrodes 214, 215 to establish a conductive path between the electrodes 214, 215 and the surface of the substrate 122.

A conductive foil 216 may optionally be disposed between the conductive pad 210 and the subpad 212. The conductive foil 216 may be coupled to a power source 242 and may provide uniform distribution of voltage applied by the power source 242 across the conductive pad 210. In embodiments wherein the conductive foil 216 is not present, the conductive pad 210 may be coupled directly to the power source 242.

The pad assembly 204 may additionally include an interposed pad 218 disposed between the subpad 212 and the conductive pad 210 to provide mechanical strength to the overlying conductive pad 210. In one embodiment, the interposed pad 218 is fabricated from a dielectric material compatible with the electrolyte and the electrochemical process. Suitable materials include polymers, such as polyurethane, polyester, mylar sheet, epoxy and polycarbonate, among others. Examples of suitable pad assemblies are described in U.S. patent application Ser. Nos. 10/455,941 and 10/455,895, all of which are hereby incorporated by reference in their entireties.

The subpad 212 is typically made of a material softer, or more compliant, than the material of the conductive pad 210. For example, the subpad can be closed-cell foam, such as polyurethane or polysilicone with voids, so that under pressure the subpad compresses. In one embodiment, the subpad 212 comprises foamed urethane. Alternatively, the subpad 212 may be formed of other materials having other structures such as a mesh, cells, or solid configurations so long as the compressibility of the subpad 212 meets the requirements detailed below. Examples of suitable subpad 212 materials include, but are not limited to, foamed polymers, elastomers, felt, impregnated felt, and plastics compatible with the polishing chemistries.

It is permissible for the material of the subpad 212 to be laterally displaced under pressure from the substrate. The subpad 212 can have a hardness in the range of from 2-90 on the Shore A scale. In one embodiment, the subpad 212 has a Shore A hardness in the range of from about 20 or less, such as 12 or less, or 5 or less. In addition, the subpad 212 has a thickness of, e.g., 30 mils or more. In one embodiment, the subpad 212 has a thickness of 90 mils or more. For example, the subpad may be about 95 to 500 mils thick, such as 95 to 200 mils, or 95 to 150 mils, or 95 to 125 mils. One example of a subpad that may be adapted to benefit from the invention is described in the previously incorporated U.S. patent application Ser. No. 10/642,128.

The counter electrode 214 is coupled to the power source 242 and may act as a single electrode zone. Alternatively, the counter electrode 214 may include a plurality of independently biasable electrode segments. In the embodiment depicted in FIG. 2, two counter electrode concentric segments 214A-B are shown, although any number or geometric configuration of counter electrode segments may be utilized. The counter electrode segments 214A-B are individually coupled to the power source 242, which includes a plurality of output terminals 280 for independently controlling the bias to each electrode segment 214A-B. By controlling the electrical bias applied between each electrode segment 214A-B and the substrate (which is biased by conductive pad 210), a plurality of independently controllable processing zones are established through the electrolyte across the diameter of the substrate 122, thereby facilitating profile control of the conductive material being removed from the substrate.

The counter electrode 214 may be comprised of corrosion resistant conductive materials, such as metals, conductive alloys, metal coated fabrics, conductive polymers, conductive pads, and the like. Conductive metals include Sn, Ni, Cu, and the like. Conductive metals may also include a corrosion resistant metal, such as Sn or Ni, coated over an active metal, such as Cu, Zn, Al, and the like. Conductive alloys include inorganic alloys and metal alloys, such as bronze, brass, stainless steel, or palladium-tin alloys, among others.

The auxiliary electrode 215 is independently controlled by the power source 242 relative to the counter electrode 214, and provides an additional process control laterally outward of the zones defined by the counter electrode segments 214A-B. In one embodiment, the auxiliary electrode 215 is disposed radially outward of the counter electrode 214. The power supplied to the auxiliary electrode 215 has little or no contribution toward the polishing rates in the areas away from the edges (e.g., the center) of the substrate during polishing. This allows the polishing rate at the edge to be tuned relative to the profile established over the counter electrode 214 by adjusting the power and/or polarity of the auxiliary electrode relative to the counter electrode 214. By separately biasing the plurality of counter electrode segments and the auxiliary electrode, edge profile control may be decoupled from profile control of the center of the substrate, resulting in improved substrate processing control and uniformity.

Using the above described profile control, and using different voltage potentials for counter electrode segments 214A-B, and for the auxiliary electrode 215, the polishing of the perimeter of the substrate can be more readily controlled. By applying a higher potential to the auxiliary electrode relative to the potential applied to counter electrode segments 214A-B, a fast edge polish rate may be obtained. Alternatively, by applying a lower potential to the auxiliary electrode relative to the counter electrode segments 214A-B, a slow edge polish rate may be obtained. It is desirable to minimize the potential applied to the auxiliary electrode 215 to minimize and/or prevent bubble generation formed by oxygen or hydrogen evolution at the electrode.

The auxiliary electrode 215 is fabricated from and/or coated with a material different than the counter electrode 214. The auxiliary electrode 215 may be fabricated from and/or coated with a material having a propensity for bubble generation during processing that is less than that of the counter electrode 214. In one embodiment, the auxiliary electrode 215 is comprised of or coated with platinum and/or titanium. In another embodiment, the auxiliary electrode may be comprised of carbon or graphite. In yet another embodiment, the auxiliary electrode 215 may be made of a titanium containing material having an inert coating. An inert coating material may be a noble metal, such as platinum, and the like. The coating of the auxiliary electrode with an inert material inhibits the formation of oxides on the auxiliary electrode surface, thus enhancing electrical conduction between the electrode and the electrolyte. In this way, the detrimental effect of bubble generation may be avoided. By utilizing an inert surface, an optimized polishing rate may be obtained at lower potentials on the auxiliary electrode 215. For example, in one embodiment, an applied potential on the auxiliary electrode 215 may be reduced by 500 mV.

In one embodiment, the inert coating material may have a thickness of about 1 to about 20 microns. In other embodiments, the coating surface may have a thickness of about 5 to about 10 microns.

Using an inert configuration of the auxiliary electrode may reduce any contamination that may occur as a result of a chemical interaction between the auxiliary electrode and the electrolyte (e.g. polishing solution). In addition, the use of an inert metal coating on the surface of the auxiliary electrode 215 can reduce the interaction between the electrolyte and the materials that are susceptible to galvanized corrosion.

Figure 3A:
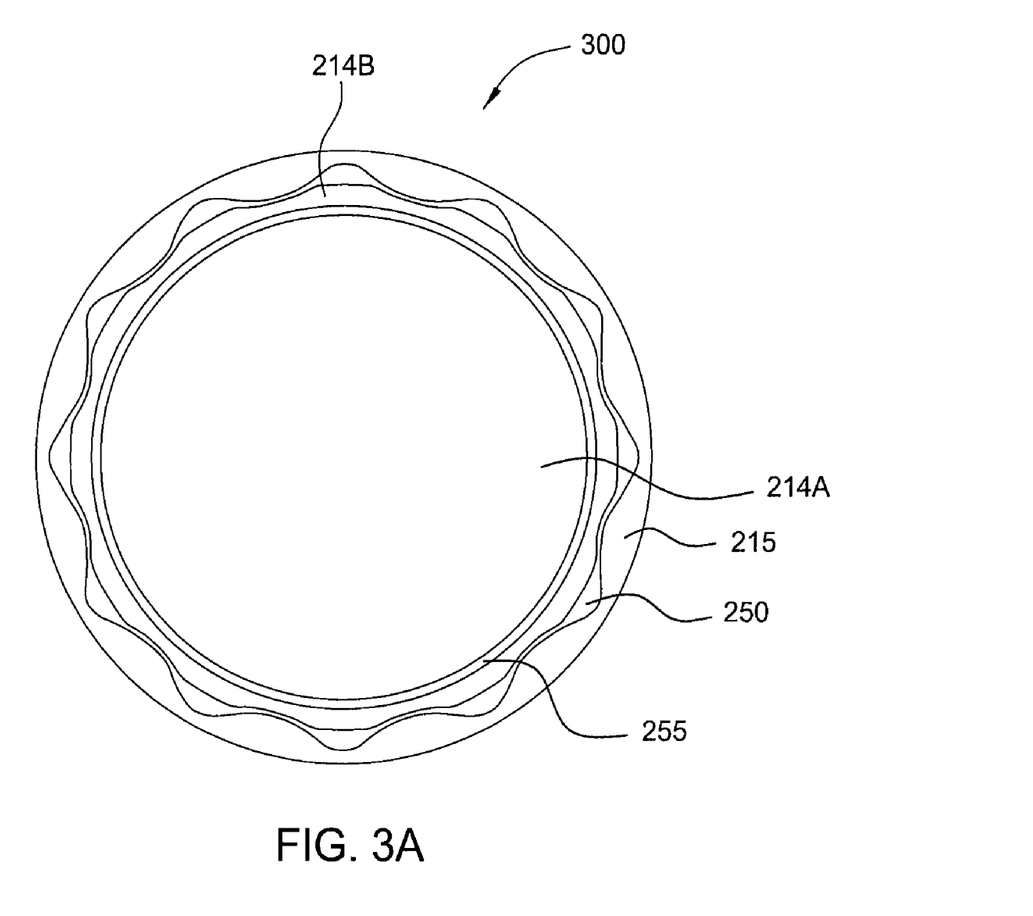
FIG. 3A illustrates a bottom view of an electrode assembly.
Figure 3B:
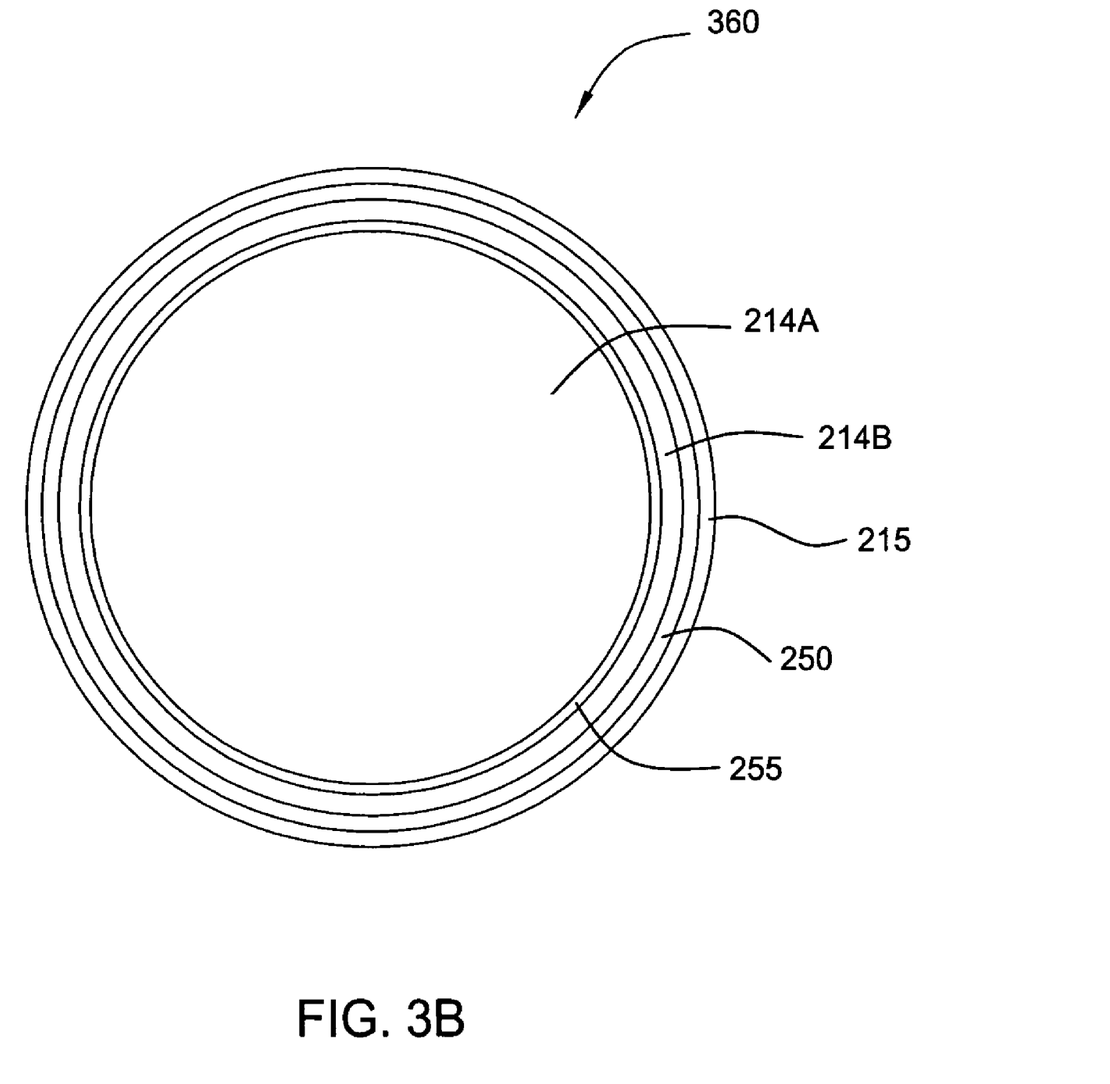
FIG. 3B illustrates a bottom view of another electrode assembly.

FIGS. 3A-B show bottom views of alternative embodiments of zoned counter electrodes 300 and 360 that may be advantageously adapted for use with the various embodiments of the invention described herein. In the embodiment of FIG. 3A, counter electrode 300 includes a first dielectric spacer 255 disposed between counter electrode segments 214A-B. The counter electrode segments 214A-B are arranged to create a plurality of independently biasable zones across the surface of the counter electrode 300. An auxiliary electrode 215 circumscribes the counter electrode 300. A second dielectric spacer 250 separates the auxiliary electrode 215 and the counter electrode segment 214B. When polishing, the substrate 122 is moved across a plurality of zones biased at different potentials to control the polishing rate profile. Examples of suitable spacers 250 and 255 materials include, but are not limited to, polymers, ceramics, and plastics compatible with the electrolyte (e.g., polishing solution).

In one embodiment, counter electrode segment 214B and the auxiliary electrode 215 have a substantially sinusoidal pattern. This embodiment will enable the substrate to be gradually exposed to polarization during polishing, rather than a sharp or distinct change in potential from a first zone to a second zone during polishing. Although the facing edges of the counter electrode segment 214B and the auxiliary electrode 215, as shown in FIG. 3A, have a substantially sinusoidal pattern, those skilled in the art will recognize that electrode segment 214B and the auxiliary electrode 215 may comprise any other patterns (e.g., curves, or zigzag). As shown, the spacing shown between the electrode segment 214B and the auxiliary electrode 215 may be uniform. However, the spacing may deviate in another embodiment. Alternatively, in the embodiment depicted in FIG. 3B, the counter electrode segment 214B and the auxiliary electrode 215 may form concentric rings.

In some embodiments, one or more electrode segments may be nested within an electrode. In one embodiment, one or more electrodes may be disposed radially inward of an electrode. For example, one electrode may circumscribe another electrode.

Figure 4:
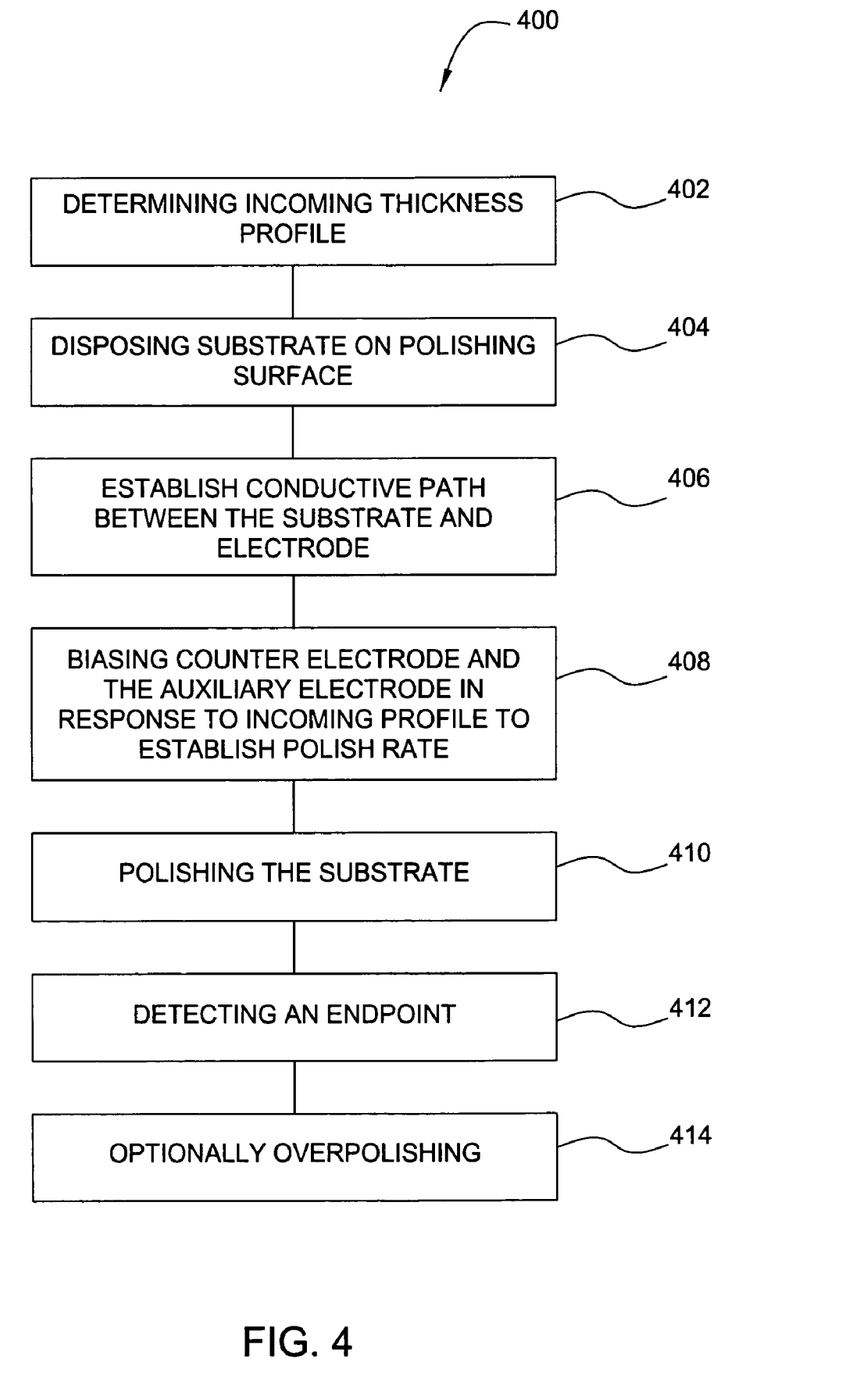
FIG. 4 illustrates an embodiment of a method for electroprocessing substrates.

FIG. 4 illustrates one embodiment of a method 400 for electroprocessing a substrate. The method 400 may be performed, for example, by processing system 100 for controlling polishing profile in an ECMP process and may be best understood with simultaneous reference to FIGS. 1 and 2. The method 400 begins at step 402 by determining the incoming thickness profile of substrate 122. For example, the metrology module 107 may be used to obtain a metric indicative of the thickness profile of the incoming substrate. At step 404, the substrate 122 is disposed on a polishing surface 220 in the ECMP station 130 and at step 406 an electrolyte is provided between the surface of the substrate, electrode 214 and auxiliary electrode 215 and in this way a conductive path between the substrate and the electrodes is established.

At step 408, an electrical bias is established between the substrate, the counter electrode segments 214A-B, and the auxiliary electrode 215. In one embodiment, the electrical bias may be independently controlled between the counter electrode segments 214A-B and the auxiliary electrode 215, thereby facilitating removal profile control.

In one embodiment, the power source 242 is a direct current (DC) power supply. However, the power source 242 may also be an alternating current (AC) power supply. The power source 242 is capable of matching frequency of the biasing potential to the position of the substrate 122 relative to the auxiliary electrode 215 and counter electrode 214. The power source 242 is capable of selectively and independently applying either a positive or negative bias to the counter electrode 214, and auxiliary electrode 215. The power source may controllably apply power in the range of at least between about minus (−) 10 to about positive (+) 10 VDC to the electrode 214 and to the auxiliary electrode 215.

Depending on the incoming profile of the substrate, the counter electrode segments 214A-B and auxiliary electrode 215 may be biased for an appropriate fast edge polish rate or a slow edge polish rate, while minimizing the potential applied to the auxiliary electrode 215 to minimize and/or prevent bubble generation at the electrode. In one embodiment, the auxiliary electrode 215 is biased with a potential higher than the potential of the counter electrode segments 214A-B, thereby resulting in a fast edge polish rate in response to an incoming profile having greater material thickness near the edge of the substrate being processed. For example, the auxiliary electrode 215 may be positively biased with a voltage greater than about 1.5 VDC. In another embodiment, the auxiliary electrode 215 may be biased with a potential that is lower than the potential of the counter electrode segments 214A-B thereby resulting in a slow edge polish rate in response to an incoming profile having lower thickness near the edge of the substrate. For example, the auxiliary electrode 215 may be biased with a voltage less than about 1.8 VDC (including negative voltages).

In one embodiment, the auxiliary electrode 215 may be negatively biased with a voltage of less than about 0 VDC. In one embodiment, the auxiliary electrode 215 is biased with voltage of about −2.1 VDC to about −2.5 VDC while the counter electrode segments 214A-B may be biased with voltage of about −1.8 VDC to about −2.1 VDC, with the respect to substrate, for a fast edge polish rate. In another embodiment, the auxiliary electrode 215 is biased with a voltage of about −1.0 VDC to about −1.5 VDC while the counter electrode segments 214A-B may be biased with a voltage of about −1.8 VDC to about −2.1 VDC, with respect to the substrate, for a slow edge polish rate.

In another embodiment, the auxiliary electrode may be positively-biased with a voltage of about 0 VDC to about 1.0 VDC while the counter electrode segments 214A-B are negatively biased with a voltage of about −1.8 VDC to about −2.1 VDC, with respect to the substrate, for a slow edge polish rate.

In one embodiment, the bias applied to the auxiliary electrode may be adapted to deliver a current density of up to about 100 milliamps/cm$^2$. For example, a current density of about 3.1 milliamps/cm$^2$ to about 9.3 milliamps/cm$^2$ may be utilized while the auxiliary electrode may be biased with a voltage of about −2.1 VDC. In another example, a current density of about 0.1 milliamps/cm$^2$ to about 4.1 milliamps/cm$^2$ may be utilized while the auxiliary electrode may be biased with a voltage of about −1.8 VDC. In yet another example, a current density of 6.6 milliamps/cm$^2$ with an applied current of about 4.5 A, having a polish rate of about 1500 Angstrom/min, may be observed.

In one embodiment of the present invention, a fast edge polishing step may be utilized in a bulk material ECMP station, for example, ECMP polishing station 132. In another embodiment, a slow edge polishing step may be utilized while residual conductive material is removed from the substrate at the residual ECMP station, for example ECMP polishing station 130, as described herein.

After the substrate is polished at step 410, the method 400 is terminated at step 412 when an endpoint is determined. The endpoint may be determined by polishing time, eddy current sensing, interferometer, optical techniques, voltage, charge or current monitoring, among other suitable endpoint detection techniques. Examples of suitable endpoint techniques that may be adapted to benefit from the invention are described in the previously incorporated U.S. patent application Ser. Nos. 10/244,688, 10/456,851, 10/949,160, and 10/940,603. An optional overpolish step 414 may also be utilized to remove residual conductive material after the endpoint is reached, for example, by using a lower voltage, timed polish.

Embodiments of the present invention provide methods and apparatus that may be utilized to improve profile control of an electroprocess. For example, an auxiliary electrode may be coated with an inert material thereby reducing the required potential applied to the auxiliary electrode to minimize and/or prevent bubble generation formed by oxygen evolution while maintaining a desired polish rate. Using an inert configuration of the auxiliary electrode may reduce any contamination that may occur as a result of a chemical interaction between the auxiliary electrode and the polishing solution.

Elements of the various embodiment described herein are not mutually exclusive, but are contemplated that the elements may be combined to form other embodiments of the invention. While the foregoing is directed to the illustrative embodiment of the present invention, other and further embodiments of the invention may be devised without departing from the basic scope thereof, and the scope thereof is determined by the claims that follow.

What is claimed is:

1. A method of electroprocessing a substrate, comprising:
   biasing a conductive processing surface;
   contacting the substrate to the biased conductive processing surface;
   biasing a first electrode to establish a first electroprocessing zone between the first electrode and the substrate; and
   biasing a second electrode to establish a second electroprocessing zone, wherein the second electrode is radially disposed inward of the first electrode and fabricated from a different material and biased at a different potential from the first electrode.

2. The method of claim 1, wherein the biasing the first and the second electrodes comprises:
   applying a positive voltage to the first electrode and a negative voltage to the second electrode for a slow edge polish rate, wherein the positive voltage is between about 0 VDC to about 1.0 VDC, and the negative voltage is between about −1.8 VDC and about −2.1 VDC.

3. The method of claim 1, wherein the biasing the first and the second electrodes comprises:
   applying a first negative voltage to the first electrode and applying a second negative voltage to the second electrode for a slow edge polish rate, wherein the first negative voltage is between about −1.0 VDC to about −1.5 VDC, and the second negative voltage is between about −1.8 VDC and about −2.1 VDC.

4. The method of claim 1, wherein the biasing the first and the second electrodes comprises:
   applying a first negative voltage to the first electrode and applying a second negative voltage to the second electrode for a fast edge polish rate , wherein the first negative voltage is between about −2.1 VDC to about −2.5 VDC, and the second negative voltage is between about −1.8 VDC to about −2.1 VDC.

5. The method of claim 1, wherein the first electrode further comprises an inert coating.

6. The method of claim 1, wherein the inert coating is configured to reduce contamination by preventing corrosion of a body of the first electrode in contact with an electrolyte.

7. A method of electroprocessing a substrate, comprising:
   detecting an incoming thickness profile of the substrate;
   selecting a polish rate in response to the incoming thickness profile;
   biasing a first electrode to establish a first electroprocessing zone between the first electrode and the substrate based on the incoming profile; and
   biasing a second electrode disposed radially inward of the first electrode with a potential different than the first electrode to establish a second electroprocessing zone between the second electrode and the substrate, wherein the first electrode and the second electrode are formed from different materials.

8. The method of claim 7 further comprising:
   individually controlling the bias applied to each of the electrodes.

9. The method of claim 7, wherein the biasing the first electrode comprises:
   applying a positive voltage to the first electrode.

10. The method of claim 7 wherein the biasing the first and the second electrodes comprises:
    applying a positive voltage to the first electrode and a negative voltage to the second electrode for a slow edge polish rate, wherein the positive voltage is between about 0 VDC to about 1.0 VDC, and the negative voltage is between about −1.8 VDC and about −2.1 VDC.

11. The method of claim 7, wherein the biasing the first and the second electrodes comprises:
    applying a first negative voltage to the first electrode and applying a second negative voltage to the second electrode for a fast edge polish rate, wherein the first negative voltage is between about −2.1 VDC to about −2.5 VDC, and the second negative voltage is between about −1.8 VDC to about −2.1 VDC.

* * * * *